United States Patent
Shah et al.

(10) Patent No.: US 9,104,559 B2
(45) Date of Patent: *Aug. 11, 2015

(54) PREVENTING OUT-OF-SPACE ERRORS FOR LEGACY OPTION ROM IN A COMPUTING SYSTEM

(71) Applicant: LENOVO ENTERPRISE SOLUTIONS (SINGAPORE) PTE. LTD., Singapore (SG)

(72) Inventors: Mehul M. Shah, Austin, TX (US); Wingcheung Tam, Austin, TX (US); Wen Wei Tang, Shanghai (CN); Timothy M. Wiwel, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 207 days.

This patent is subject to a terminal disclaimer.

(21) Appl. No.: 13/853,124

(22) Filed: Mar. 29, 2013

(65) Prior Publication Data

US 2014/0297917 A1    Oct. 2, 2014

Related U.S. Application Data

(63) Continuation of application No. 13/852,359, filed on Mar. 28, 2013.

(51) Int. Cl.
*G06F 12/02* (2006.01)
*G06F 12/06* (2006.01)

(52) U.S. Cl.
CPC .................... *G06F 12/0638* (2013.01)

(58) Field of Classification Search
None
See application file for complete search history.

(56) References Cited

U.S. PATENT DOCUMENTS

| | | |
|---|---|---|
| 6,567,911 B1 | 5/2003 | Mahmoud |
| 6,651,165 B1* | 11/2003 | Johnson ........................... 713/2 |
| 7,103,767 B2 | 9/2006 | Natu |
| 7,127,603 B2 | 10/2006 | Rangarajan et al. |
| 7,254,676 B2 | 8/2007 | Datta et al. |
| 7,565,521 B2 | 7/2009 | Mahmoud |
| 7,721,080 B2 | 5/2010 | Swanson et al. |
| 7,873,754 B2 | 1/2011 | Bircher et al. |
| 2005/0027976 A1* | 2/2005 | Stephan et al. .................. 713/1 |
| 2006/0041710 A1* | 2/2006 | Silva et al. ..................... 711/102 |
| 2007/0233995 A1 | 10/2007 | Yamazaki et al. |
| 2010/0169633 A1 | 7/2010 | Zimmer et al. |
| 2010/0241840 A1 | 9/2010 | Tabuchi et al. |
| 2011/0246985 A1 | 10/2011 | Zhou et al. |
| 2012/0159520 A1 | 6/2012 | Ueltschey, III et al. |

OTHER PUBLICATIONS

FOREIGN PATENT DOCUMENTS

WO    WO 2011/149481 A1    12/2011

OTHER PUBLICATIONS

Oracle, "Legacy Option ROM Allocation—Netra Server X3-2", oracle.com (online), [accessed Oct. 10, 2012], 1 pp., URL: http://docs.oracle.com/cd/E27124_01/html/E27125/z40035f21405760.html.

Wikipedia, "Option ROM", wikipedia.org (online), [accessed Oct. 25, 2012], 2 pp., URL: http://en.wikipedia.org/wiki/Option_ROM.

Oracle, "Resolved Issues and Documentation Errata", oracle.com (online), [accessed Oct. 26, 2012], 9 pp., URL: http://docs.oracle.com/cd/E19121-01/sf.x4240/820-2396-18/ResolvedIssues.html.

* cited by examiner

*Primary Examiner* — Duc Doan

(74) *Attorney, Agent, or Firm* — Edward J. Lenart; Katherine S. Brown; Kennedy Lenart Spraggins LLP

(57) ABSTRACT

Preventing out-of-space errors for legacy option ROM in a computing system, including: iteratively for each option ROM in the computing system: loading, into an option ROM memory, the option ROM; executing, from the option ROM memory, the option ROM; and removing, from the option ROM memory, the option ROM.

6 Claims, 3 Drawing Sheets

PREVENTING OUT-OF-SPACE ERRORS FOR LEGACY OPTION ROM IN A COMPUTING SYSTEM

CROSS-REFERENCE TO RELATED APPLICATION

This application is a continuation application of and claims priority from U.S. patent application Ser. No. 13/852,359, filed on Mar. 28, 2013.

BACKGROUND OF THE INVENTION

1. Field of the Invention

The field of the invention is data processing, or, more specifically, methods, apparatus, and products for preventing out-of-space errors for legacy option ROM in a computing system.

2. Description of Related Art

Modern computing systems include computing devices that have option ROMs for storing firmware for initializing the computing devices. Modern computing systems frequently have very little memory available for storing such firmware, which can cause problems in initializing the computing devices. Modern solutions to this problem can result in devices failing to initialize.

SUMMARY OF THE INVENTION

Methods, apparatuses, and products for preventing out-of-space errors for legacy option ROM in a computing system, including: iteratively for each option ROM in the computing system: loading, into an option ROM memory, the option ROM; executing, from the option ROM memory, the option ROM; and removing, from the option ROM memory, the option ROM.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
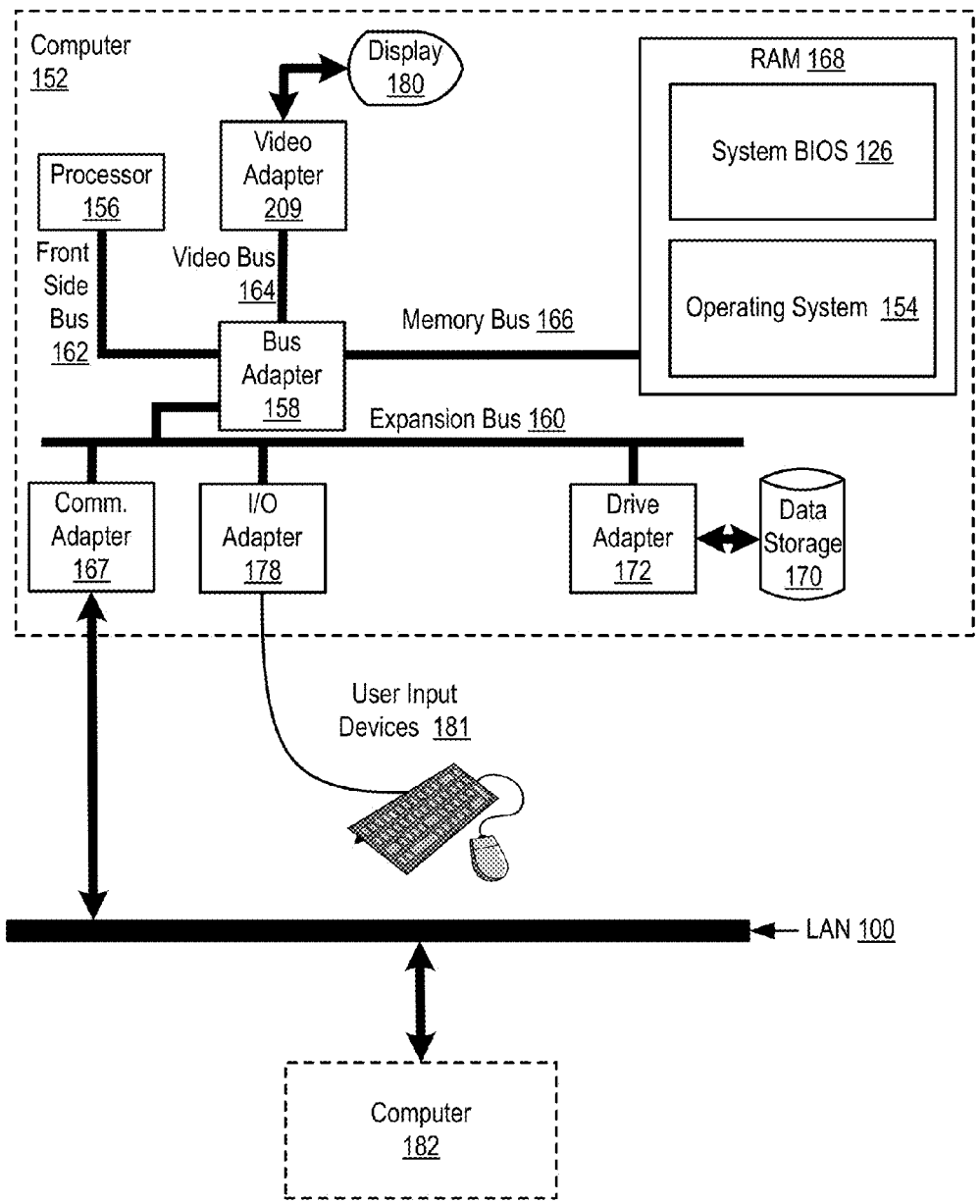
FIG. 1 sets forth a block diagram of automated computing machinery comprising an example computer useful in preventing out-of-space errors for legacy option ROM in a computing system according to embodiments of the present invention.

Example methods, apparatus, and products for preventing out-of-space errors for legacy option ROM in a computing system in accordance with the present invention are described with reference to the accompanying drawings, beginning with FIG. 1. FIG. 1 sets forth a block diagram of automated computing machinery comprising an example computer (152) useful in preventing out-of-space errors for legacy option ROM in a computing system according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is system BIOS (126), a module of computer program instructions that is often the first software run by a computer when powered on. The system BIOS (126) is used to initialize and test the system hardware components and to load an operating system (154) or other program from a mass memory device. The system BIOS (126) can provide a consistent way for application programs and operating systems to interact with the keyboard, display, and other input/output devices. In the example of FIG. 1, the system BIOS (126) may be further configured to prevent out-of-space errors for legacy option ROM.

The computer (152) of FIG. 1 can include a plurality of computing devices that include an option ROM. Each option ROM may include firmware that controls bootable computing devices in the computer (152). The firmware on one each option ROM may be called while booting the computer (152). The execution of the firmware on each option ROM can enable the computer (152) to use the associated computing device prior to the loading of the operating system (154).

In the example of FIG. 1, the system BIOS (126) may be further configured to prevent out-of-space errors for legacy option ROM by loading, into an option ROM memory, the option ROM of a computing device. The option ROM memory represents a predetermined area in computer memory that is dedicated to storing option ROMs. For example, the option ROM memory may be mapped to the C and D segments of main memory. In such an example, the C and D segments of main memory represent areas of main memory whose addresses range from C0000 to DFFFF. Alternatively, in some embodiments the option ROM memory can include scratch memory. For example, PCI firmware 3.0 allows initialization from any scratch memory below 1 MB. Loading the option ROM into an option ROM memory may be carried out by copying the contents of the option ROM for a particular computing device and writing the contents of the option ROM to the option ROM memory.

In the example of FIG. 1, the system BIOS (126) may be further configured to prevent out-of-space errors for legacy option ROM by executing, from the option ROM memory, the option ROM. Executing the option ROM may be carried out by a computer processor (156) in the computer (152) executing the firmware instructions that were loaded from the option ROM to the option ROM memory. The firmware instructions may include instructions for initializing the computing device that includes the option ROM, such that the computer (152) can use the computing device.

In the example of FIG. 1, the system BIOS (126) may be further configured to prevent out-of-space errors for legacy option ROM by removing, from the option ROM memory, the option ROM. Removing the option ROM from the option ROM memory may be carried out, for example, by deleting the contents of the option ROM that were loaded into the option ROM memory. Removing the option ROM (210) from the option ROM memory may occur in response to determining that the firmware instructions for initializing the computing device were successfully executed. By removing the option ROM from the option ROM memory, the limited space with the option ROM memory may be freed in order to initialize other computing devices. Readers will appreciate that although the option ROM and its contents are described as being removed from the option ROM memory, removing the option ROM may be accomplished by simply allowing other computing devices to overwrite the contents of the option ROM memory that include the option ROM.

The steps performed by the system BIOS (126) are carried out iteratively for each option ROM in the computer (152). As such, upon removing a particular option ROM from option ROM memory, the system BIOS (126) may determine whether there are any more option ROMs that have not been loaded into option ROM memory, executed from option ROM memory, and removed from option ROM memory.

Also stored in RAM (168) is an operating system (154). Operating systems useful in preventing out-of-space errors for legacy option ROM according to embodiments of the present invention include UNIX™, Linux™, Microsoft XP™, AIX™, IBM's i5/OS™, and others as will occur to those of skill in the art. The operating system (154) and system BIOS (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for preventing out-of-space errors for legacy option ROM according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art. In the example of FIG. 1, the disk drive adapter (172) is an example of a computing device that may include an option ROM that includes firmware instructions for initializing the disk drive adapter (172).

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus. In the example of FIG. 1, the I/O adapter (178) and video adapter (209) is an example of a computing device that may include an option ROM that includes firmware instructions for initializing the I/O adapter (178) and video adapter (209).

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for preventing out-of-space errors for legacy option ROM according to embodiments of the present invention include modems for wired dial-up communications, Ethernet (IEEE 802.3) adapters for wired data communications network communications, and 802.11 adapters for wireless data communications network communications. In the example of FIG. 1, the communications adapter (167) is an example of a computing device that may include an option ROM that includes firmware instructions for initializing the communications adapter (167).

Figure 2:
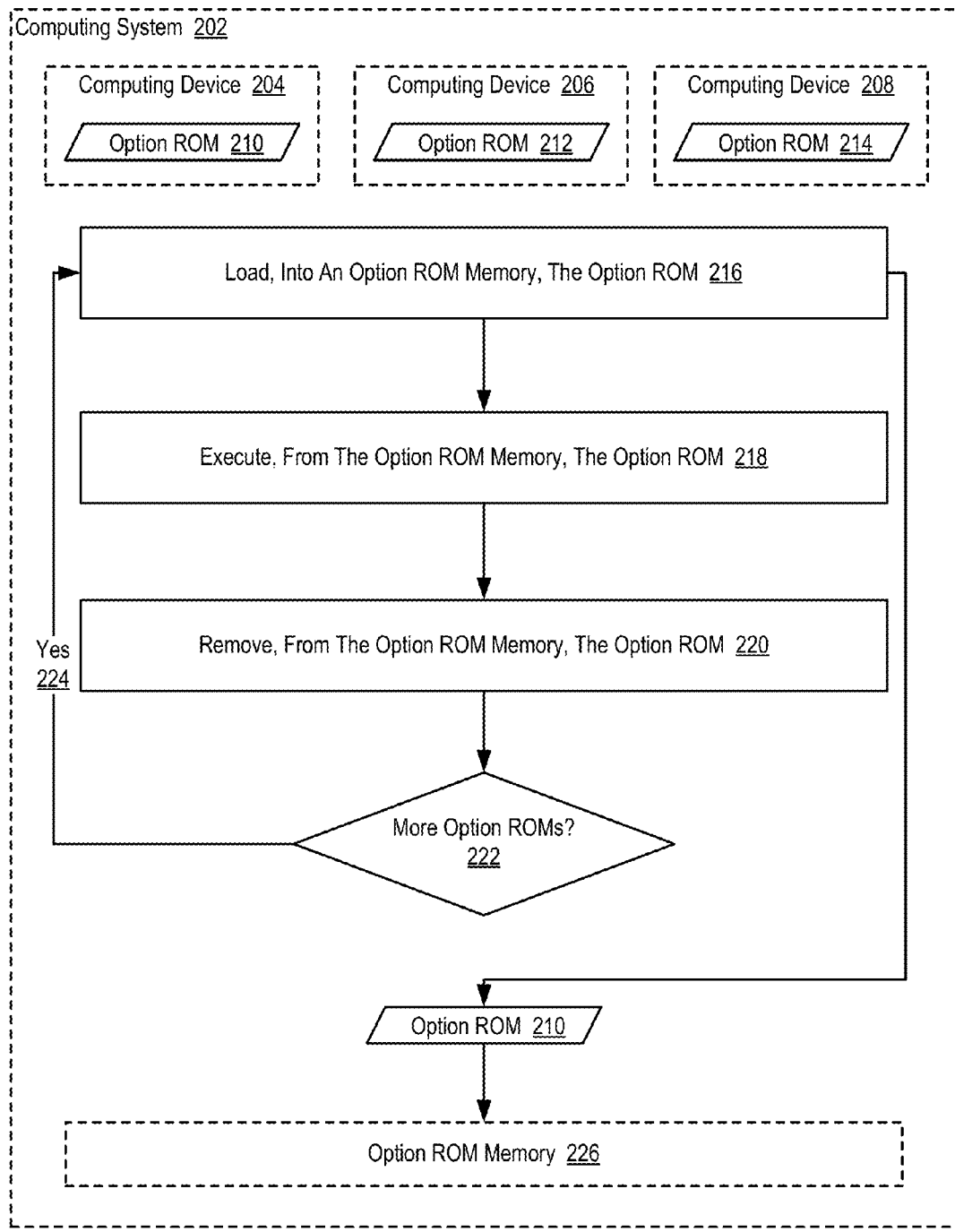
FIG. 2 sets forth a flow chart illustrating an example method for preventing out-of-space errors for legacy option ROM in a computing system according to embodiments of the present invention.

For further explanation, FIG. 2 sets forth a flow chart illustrating an example method for preventing out-of-space errors for legacy option ROM in a computing system (202) according to embodiments of the present invention. The computing system (202) of FIG. 2 includes a plurality of computing devices (204, 206, 208) that include an option ROM (210, 212, 214). Each option ROM (210, 212, 214) may include firmware that controls bootable computing devices (204, 206, 208) in the computing system (202). The firmware on one each option ROM (210, 212, 214) may be called while booting the computing system (202). The execution of the firmware on each option ROM (210, 212, 214) can enable the computing system (202) to use the associated computing device (204, 206, 208) prior to the loading of the operating system. Examples of such computing devices (204, 206, 208) can include memory devices, display devices, networking devices, and other bootable components in the computing system (202). The steps described below in the example method of FIG. 2 are carried out iteratively for each option ROM (210, 212, 214) in the computing system (202).

The example method of FIG. 2 includes loading (216), into an option ROM memory (226), the option ROM (210). In the example method of FIG. 2, option ROM memory (226) represents a predetermined area in computer memory that is dedicated to storing option ROMs (210, 212, 214). For example, the option ROM memory (226) may be mapped to the C and D segments of main memory. In such an example, the C and D segments of main memory represent areas of main memory whose addresses range from C0000 to DFFFF. Alternatively, in some embodiments the option ROM memory (226) can include scratch memory. For example, PCI firmware 3.0 allows initialization from any scratch memory below 1 MB. In the example method of FIG. 2, loading (216) the option ROM (210) into an option ROM memory (226) may be carried out by copying the contents of the option ROM (210) for a particular computing device (204) and writing the contents of the option ROM (210) to the option ROM memory (226).

The example method of FIG. 2 also includes executing (218), from the option ROM memory (226), the option ROM (210). In the example method of FIG. 2, executing (218) the option ROM (210) may be carried out by a computer processor in the computing system (202) executing the firmware instructions that were loaded (216) from the option ROM (210) to the option ROM memory (226). The firmware instructions may include instructions for initializing the computing device (204) that includes the option ROM (210), such that the computing system (202) can use the computing device (204).

The example method of FIG. 2 also includes removing (220), from the option ROM memory (226), the option ROM (210). In the example method of FIG. 2, removing (220) the option ROM (210) from the option ROM memory (226) may be carried out, for example, by deleting the contents of the option ROM (210) that were loaded (206) into the option ROM memory (226). In the example method of FIG. 2, removing (220) the option ROM (210) from the option ROM memory (226) may occur in response to determining that the firmware instructions for initializing the computing device (204) were successfully executed. By removing (220) the option ROM (210) from the option ROM memory (226), the limited space with the option ROM memory (226) may be freed in order to initialize other computing devices (206, 208). Readers will appreciate that although the option ROM (210) and its contents are described as being removed (220) from the option ROM memory (226), removing (220) the option ROM (210) may be accomplished by simply allowing other computing devices to overwrite the contents of the option ROM memory (226) that include the option ROM (210).

As described above, the steps in the example method of FIG. 2 are carried out iteratively for each option ROM (210, 212, 214) in the computing system (202). As such, upon removing (220) a particular option ROM (210) from option ROM memory (226), the example method of FIG. 2 can include determining (222) whether there are any more option ROMs (212, 214) that have not been loaded (216) into option ROM memory (226), executed (218) from option ROM memory (226), and removed (220) from option ROM memory (226). In such an example, if it is affirmatively (224) determined there are any more option ROMs (212, 214) that have not been loaded (216) into option ROM memory (226), executed (218) from option ROM memory (226), and removed (220) from option ROM memory (226), the steps described in FIG. 2 may be carried out for each additional option ROM (212, 214). Readers will appreciate that option ROMS (210, 212, 214) may be loaded (216), executed (218), and removed (220) according to a predetermined order. Such a predetermined order may be specified by a system administrator, specified in the system BIOS, or specified in other ways as will occur to those of skill in the art. In such an example, the predetermined order can have the effect of causing the most critical devices in the computing system (202) to be initialized first while less critical devices in the computing system (202) are initialized last.

Figure 3:
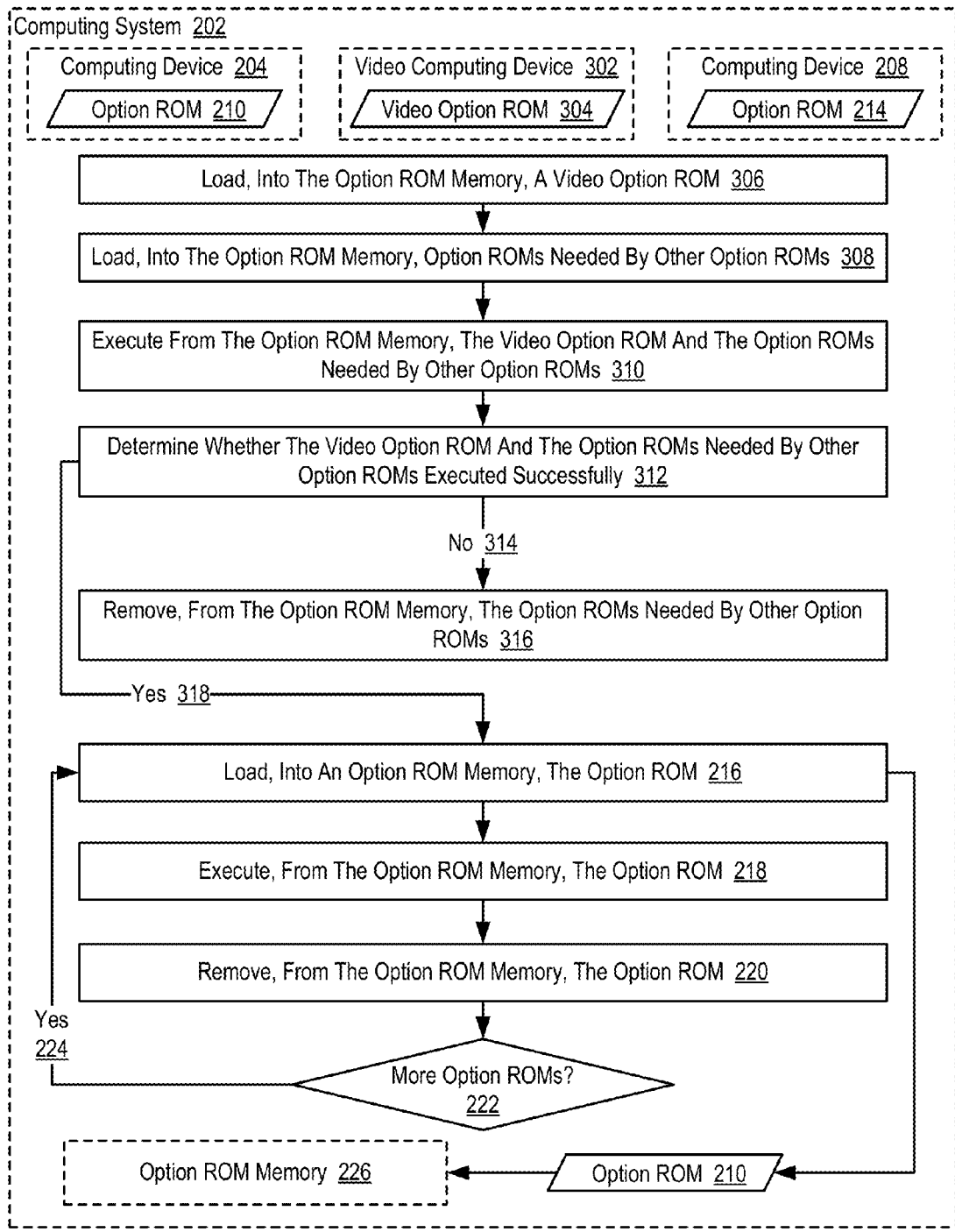
FIG. 3 sets forth a flow chart illustrating an additional example method for preventing out-of-space errors for legacy option ROM in a computing system according to embodiments of the present invention.

For further explanation, FIG. 3 sets forth a flow chart illustrating an additional example method for preventing out-of-space errors for legacy option ROM in a computing system (202) according to embodiments of the present invention. The example method of FIG. 3 is similar to the example method of FIG. 2 as it also includes, iteratively for each option ROM (210, 212, 214) in the computing system (202): loading (216), into an option ROM memory (226), the option ROM (210), executing (218), from the option ROM memory (226), the option ROM (210), and removing (220), from the option ROM memory (226), the option ROM (210).

The example method of FIG. 3 also includes loading (306), into the option ROM memory (226), a video option ROM (304). In the example method of FIG. 3, the video option ROM (304) includes firmware instructions for initializing a video computing device (302). The video computing device (302) of FIG. 3 may be embodied, for example, as a video card. The video option ROM (304) may therefore be embodied as firmware for initializing video BIOS that provides a set of video-related functions that are used by programs to access the video hardware.

The example method of FIG. 3 also includes loading (308), into the option ROM memory (226), option ROMs (214) needed by other option ROMs (210). In the example method of FIG. 3, an option ROM (214) may be needed by other option ROM (210) if the computing device (208) associated with the option ROM (214) may be useful in initializing another computing device (204) that includes an option ROM (210). In such a way, the option ROMS may be loaded, executed, and removed according to a predetermined order such that more critical computing devices may be initialized earlier in the boot process.

The example method of FIG. 3 also includes executing (310), from the option ROM memory (226), the video option ROM (304) and the option ROMs (214) needed by other option ROMs (210). In the example method of FIG. 3, executing (310) the video option ROM (304) and the option ROMs (214) needed by other option ROMs (210) may be carried out by a computer processor in the computing system (202) executing the firmware instructions that were loaded (306) from the video option ROM (304) and loaded (308) from the option ROMs (214) needed by other option ROMs (210) to the option ROM memory (226). The firmware instructions may include instructions for initializing the video computing device (302) that includes the video option ROM (304) and the computing device (208) that includes the option ROMs (214) needed by other option ROMs (210), such that the computing system (202) can use the video computing device (302) and computing device (208).

The example method of FIG. 3 also includes determining (312) whether the video option ROM (304) and the option ROMs (214) needed by other option ROMs (210) executed successfully. In the example method of FIG. 3, determining (312) whether the video option ROM (304) and the option ROMs (214) needed by other option ROMs (210) executed successfully may be carried out, for example, by monitoring the computing system (202) for an error message indicating that the computing system (202) ran out of space in option ROM memory (226).

The example method of FIG. 3 also includes removing (316), from the option ROM memory (226), the option ROMs (214) needed by other option ROMs (210). In the example method of FIG. 3, removing (316) the option ROMs (214) needed by other option ROMs (210) from the option ROM memory (226) is carried out in response to determining that the video option ROM (304) and the option ROMs (214) needed by other option ROMs (210) were not (314) executed successfully. In the example method of FIG. 2, removing (316) the option ROMs (214) needed by other option ROMs (210) has the effect of allowing the firmware instructions that were stored in the video option ROM (304) and loaded (306) into option ROM memory (226) to execute successfully.

Upon successful execution of the firmware instructions that were stored in the video option ROM (304) and loaded (306) into option ROM memory (226), the firmware instructions that were stored in the video option ROM (304) and loaded (306) into option ROM memory (226) may be removed from option ROM memory (226) to free up space for the contents of the option ROMs (214) needed by other option ROMs (210). The contents of the option ROMs (214) needed by other option ROMs (210) may subsequently be executed and removed from the option ROM memory (226).

In the example method of FIG. 3, if it is affirmatively (318) determined that the video option ROM (304) and the option ROMs (214) needed by other option ROMs (210) were executed successfully, the example method of FIG. 3 can continue by iteratively for each remaining option ROM (210) in the computing system (202): loading (216), into an option ROM memory (226), the option ROM (210), executing (218), from the option ROM memory (226), the option ROM (210), and removing (220), from the option ROM memory (226), the option ROM (210).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
loading, into the option ROM memory, option ROMs needed by other option ROMs in the computing system prior to loading any of the other option ROMs, including identifying the option ROMs needed by the other option ROMs in the computing system;
executing, from the option ROM memory, the option ROMs needed by the other option ROMs prior to executing any of the other option ROMs; and iteratively for each option ROM in the computing system:
   loading, into the option ROM memory, the option ROM;
   executing, from the option ROM memory, the option ROM; and
   removing, from the option ROM memory, the option ROM.

2. The method of claim 1 further comprising:
loading, into the option ROM memory, a video option ROM; and
executing, from the option ROM memory, the video option ROM.

3. The method of claim 2 further comprising determining whether the video option ROM and the option ROMs needed by other option ROMs executed successfully; and
   responsive to determining that the video option ROM and the option ROMs needed by other option ROMs were not executed successfully, removing, from the option ROM memory, the option ROMs needed by other option ROMs.

4. The method of claim 1 wherein the option ROMS are loaded, executed, and removed according to a predetermined order.

5. The method of claim 1 wherein the option ROM memory includes the C and D segments of main memory.

6. The method of claim 1 wherein the option ROM memory includes scratch memory.

* * * * *